United States Patent [19]
Browne

[11] Patent Number: 4,861,649
[45] Date of Patent: Aug. 29, 1989

[54] IMPACT RESISTENT COMPOSITES

[76] Inventor: James M. Browne, 21 Pillon Real, Pleasant Hill, Calif. 94523

[21] Appl. No.: 115,280

[22] Filed: Nov. 2, 1987

[51] Int. Cl.$^4$ ............................................. B32B 3/26
[52] U.S. Cl. .................................... 428/240; 428/241; 428/242; 428/244; 428/283; 428/313.3; 428/313.5; 428/313.9; 428/902; 428/911
[58] Field of Search ............... 428/240, 241, 242, 244, 428/283, 313.3, 313.5, 313.9, 902, 911

[56] References Cited

U.S. PATENT DOCUMENTS

| | | | |
|---|---|---|---|
| 3,707,434 | 12/1972 | Stayner | 428/313.5 |
| 3,788,937 | 1/1974 | Lee | 428/313.9 |
| 4,013,810 | 3/1977 | Long | 428/313.9 |
| 4,180,211 | 12/1979 | Olcott et al. | 428/313.3 |
| 4,292,882 | 10/1981 | Clausen | 428/240 |
| 4,362,778 | 12/1982 | Anderson et al. | 428/313.5 |
| 4,568,603 | 2/1986 | Oldham | 428/313.3 |

Primary Examiner—William J. Van Balen
Attorney, Agent, or Firm—George A. Skoler

[57] ABSTRACT

The invention relates to an impact resistent syntactic foam-prepreg composite material comprising syntactic foam of microballoons in a matrix resin bonded to a compatible resin containing carbon fiber prepeg in which the syntactic foam is one or more thin uniform layers located within the composite material sufficiently close to an impact prone surface of the composite to enhance the composite's ability to withstand the impact through such surface.

5 Claims, 1 Drawing Sheet

IMPACT RESISTENT COMPOSITES

RELATED APPLICATIONS

This application is related to the following commonly assigned applications, filed on even date herewith: Ser. Nos. 115,281 and 115,485.

BRIEF DESCRIPTION OF THE INVENTION

An impact resistent syntactic foam-prepreg composite material comprising syntactic foam of microballoons in a matrix resin bonded to a compatible resin containing carbon fiber prepreg in which the syntactic foam is one or more thin uniform layers located sufficiently close to an impact prone surface of the composite to enhance the composite's ability to withstand the impact through such surface.

BACKGROUND TO THE INVENTION

SynCore ®, sold by Hysol Grafil Company, Pittsburg, Calif. 94565 U.S.A., is a syntactic form film that takes the place of more expensive prepreg plies in stiffness critical structures. This syntactic foam is a composite material consisting of microballoons in a matrix resin. A wide variety of microballoons and matrices can be combined to make SynCore ® materials. Glass is the most common microballoon material of construction, but quartz, phenolic, carbon, thermoplastic and metal coated microballoons have been used. Epoxies curing at 350° F. (177° C.) and 250° F. (121° C.) are the most common matrix resins, but matrices of bismaleimide (BMI), phenolic, polyester, PMR-15 polyimide and acetylene terminated resins have been used to produce SynCore ® products. As a result of the wide variety of materials that successfully make SynCore ® products, they are tailorable to a variety of applications. There is a version of SynCore ® available that will cocure with all known available heat-cured composite laminating resins. Syncore ® provides a unique thin film form in isotropic foam structures. Syncore ® allows sandwich core concepts to be used in a thinner dimension than previously possible. The thickness limit on honeycomb cores is approximately 0.125 inch. Syncore ® is available in 0.007 to 0.125 inch thicknesses but can be made in thinner or thicker sheet forms. Other core materials such as wood and sheet foam can be made thin, but are not drapable and generally require an expensive/heavy adhesive film to bond to the partner composite components. In addition, Syncore ® possess excellent uniformity in thickness which provides the ability to assure quality for the composite in which it is used as a component. Syncore ® is typically used to replace prepreg plies where the intent is to increase stiffness by increasing thickness.

Designing with Syncore ® is straightforward because all of the analysis methods that apply to other core materials such as honeycomb apply to it. Flexural stiffness of flat plates and beams increases as a cubic function of thickness allowing a lighter, stiffer lamination than could be made from prepreg plies alone. Since Syncore ® on a per volume basis typically costs less than half of a comparable carbon prepreg, it also leads to a lower cost lamination. This is illustrated by the following:

(1) Adding one ply of 0.020 inch Syncore ® and eliminating one ply of prepreg does not change the weight or cost significantly, but nearly doubles the flexural rigidity.

(2) Adding one ply of 0.020 inch Syncore ® and eliminating three plies of prepreg sharply decreases the cost and weight with a small decrease in rigidity.

(3) Adding one ply of 0.040 Syncore ® and eliminating three plies of prepreg provides lower weight, cost and sharply increases rigidity.

(4) The introduction of unidirectional tape allows a further increase in performance at lower cost and weight at nearly the same thickness.

(5) A hybrid tape/fabric/Syncore ® construction gives a very attractive set of weight and cost savings coupled with a 3.4 times increase in flexural rigidity.

Syncore ® has been recommended for thin composite structures in any application where flexural stiffness, buckling, or minimum gauge construction is used. It has been shown to save weight and material cost in carbon fiber composites. It has been been offered to save weight at approximately the same cost in the case of glass fiber composites.

The manufacturing methods for employing Syncore ® are very similar to those used for prepregs. Because it is not cured, it is tacky and very drapable when warmed to room temperature and is easier to layup than a comparable prepreg ply. It can be supplied in supported forms with a light weight scrim to prevent handling damage when it is frozen. It requires cold storage like prepregs, usually 0° F. ($-17.7°$ C.) or below. The various Syncore ® typically have a room temperature out-time that is much longer than their companion prepregs. Because the microballoons provide a large degree of flow control, Syncore ® does not show any unusual migration during cure when normal laminate layup and bagging procedures are used. Syncore ® is less sensitive to cure cycle variations than prepreg making the controlling factor the composite cure cycle selection. It will cure void free under full vacuum or low (e.g. about 10 p.s.i.) autoclave pressure. It has been cured at up to about 200 p.s.i. without exhibiting balloon crushing.

In a typical application, a sandwich of Syncore ® and prepreg, such as a thicker layer of Syncore ® between two thinner layers of prepreg, are held together under heat and pressure to cure the structure into a strong panel. Typical sandwich constructions of this nature are shown in U.S. Pat. Nos. 4,013,810, 4,433,068 and 3,996,654. Such composite structures typically are produced in flat sheets and in separable molds to obtain various desired shapes.

Heretofore, it has not been the intent to use Syncore ® to modify the impact resistance of composites with prepregs. The placement of Syncore ® in the conventional composites has been to avail oneself of the cost and rigidity benefits discussed above.

THE INVENTION

The invention relates to an impact resistent syntactic foamprepreg composite material comprising syntactic foam of microballoons in a matrix resin bonded to a compatible resin containing carbon fiber prepreg in which the syntactic foam is one or more thin uniform layers located within the composite material sufficiently close to an impact prone surface of the composite to enhance the composite's ability to withstand the impact through such surface.

In one embodiment of the invention, the composite material comprises a plurality of layers of a prepreg construction of continuous filaments of high modulus fiber in a resin matrix and at least one layer of a thin film of uniform thickness of syntactic foam comprising rigid microballoons uniformly dispersed in a matrix resin cocurable with the resin matrix of the prepreg in which at least one layer of the syntactic foam is located within the composite material sufficiently close to an impact prone surface of the composite to enhance the composite's ability to withstand the impact through such surface.

In another embodiment of the invention, the composite of the invention comprises at least one layer of a thin film of uniform thickness of a syntactic foam containing rigid microballoons in a resin matrix laminated to a prepreg construction of continuous filaments of high modulus fiber in a resin matrix and separated from the exterior surface by about one (1) to about ten (10) layers of such prepreg and at least one layer of the syntactic foam is located within the composite material sufficiently close to an impact prone surace of the composite to enhance the composite's ability to withstand the impact through such surface.

DETAILS OF THE INVENTION

Figure 1:
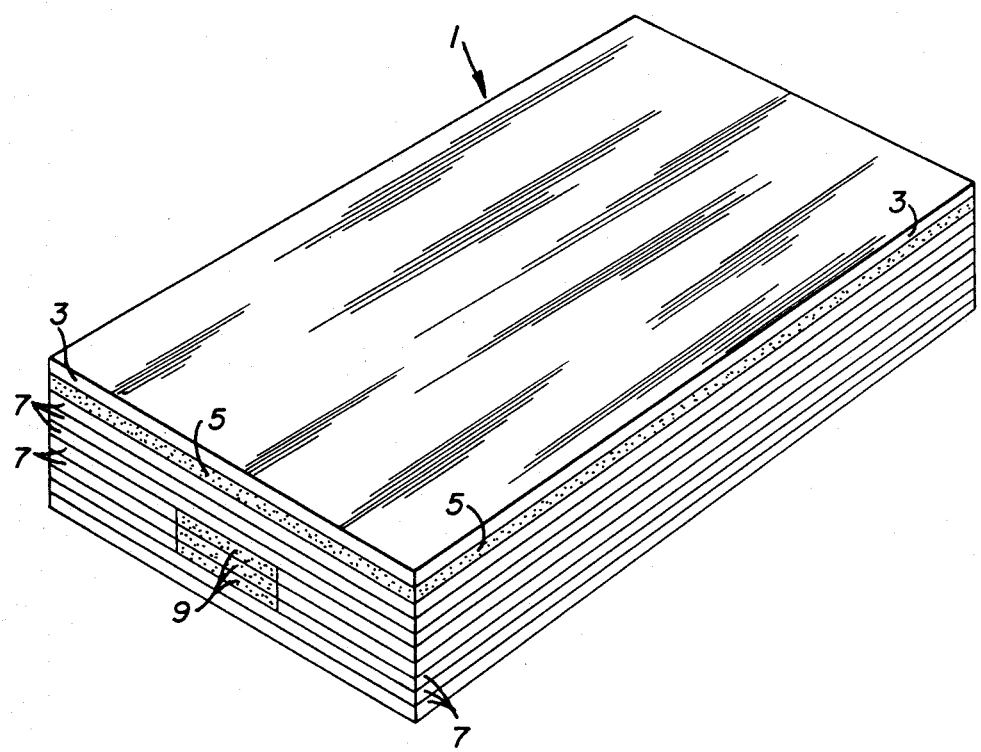
FIG. 1 depicts a perspective view of a layered laminated flat sheet construction encompassed by the invention.

The impact resistant constructions of the invention provide a combination of unexpected advantages over the conventional prepreg composites using SynCore ®, such as:

Enhanced buckling load capabilities.
Enhanced impact resistance.

The composites of the invention comprise at least one (1) layer of a prepreg of unidirectionally aligned high modulus continuous filaments impregnated in a thermosetting resin, forming the exterior of the composite, and at least one isotropic layer a thin film of uniform thickness of syntactic foam comprising rigid microballoons in a resin matrix chemically bonded to such prepreg, such as through other prepreg bhemically bonded within the composite. The term "chemically bonded" means the adhesion of one layer to another in the composite by associative, covalent, ionic or hydrogen, and the like, bonding.

The syntactic foam comprising rigid microballoons in a resin matrix should be located within the composite's construction sufficiently close to the exterior surface that it can make a property contribution. In that context, the composite of the invention comprises at least one layer of a thin film of uniform thickness of a syntactic foam containing rigid microballoons in a resin matrix laminated to a prepreg construction of continuous filaments of high modulus fiber in a resin matrix and separated from the exterior composite surface by about one (1) to about ten (10) layers of such prepreg, preferably by about one (1) to about five (5) layers of such prepreg, and most preferably, by about one (1) to about three (3) layers of such prepreg. It is believed that the syntactic foam layer(s) should constitute at least about 20 volume percent of the wall thickness of the construction and should start to reside within about ten (10) laminate layers of thickness from the impact surface of the construction to achieve the benefits of impact resistance.

This is illustrated in FIG. 1. Composite sheet 1 comprises an exterior layer 3 made up of a carbon or graphite filament prepreg. It is this surface through which any impact will be felt. Because of this, below exterior prepreg layer 3 is placed syntactic foam layer 5 to absorb the energy of impacts upon layer 3. Layer 5 may be made of a SynCore ® film which compliments the properties of layers 3 and 7. Layer 5 could have been represented by a plurality of syntactic foam layers to accommodate the expectancy of greater impacts on layer 3. Layers 7, prepreg layers, provide the body of sheet 1. Three layers, 9 of syntactic foam are placed in the core of sheet 1 to provide the typical stiffening properties to sheet 1.

The prepreg comprises continuous filaments of high performance materials such as those having a melting point ($T_m$) or glass transition temperature ($T_g$) of at least about 130° C. Suitable filaments include, by way of example, glass filaments, carbon and graphite filaments, aromatic polyamides (polyphenyleneterephthalamide) such as Kevlar ®, metal fibers such as aluminum, steel and tungsten, boron fibers, and the like.

The filaments are typically bundled into tows and the tows are assembled and spread out into a relatively thin sheet which is either coated or impregnated by the matrix resin. The matrix resin is the typical high performance thermosetting or thermosettable resins. The combination of the filament and the resin results in a prepreg suitable for forming an advanced composite structure. The resin may be any of those thermosetting or thermosettable resins employed in the manufacture of advanced compositions. The most common class of resins are the epoxy resins. They are frequently based, inter alia, on one or more of diglycidyl ethers of bisphenol.A (2,2-bis(4-hydroxyphenyl)propane) or sym-tris(4-hydroxyphenyl)propane, their polyepoxide condensation products, cycloaliphatic epoxides, epoxy-modified novolacs (phenolformaldehyde resins) and the epoxides derived from the reaction of epichlorohydrin with analine, o-, m- or p-aminophenol methylene dianaline. Illustrative resins are epoxies curing at 350° F. (177° C.) and 250° F. (121° C.). Other thermosetting or thermosettable resins include the bismaleimide (BMI), phenolic, polyester (especially the unsaturated polyester resins typically used in SMC production), PMR-15 polyimide and acetylene terminated resins have been found suitable in the practice of the invention.

The invention does not depend on the method for making the prepreg. Many different kinds of prepregs may be employed without deviating from the invention.

The syntactic foam used in the practice of the invention comprise thin films of uniform thickness which contain rigid microballoons uniformly dispersed in a resin matrix. They may be any of the SynCore ® syntactic foams. The syntactic foam suitable for use in the practice of the invention desirably possesses cocurable qualities with the prepreg. It should be appreciated in making the composite products of the invention that both the prepreg and the syntactic foam comprising rigid microballoons in a resin matrix are not fully cured prior to the construction of the construction, and only after deriving the desired construction is the combination cured.

The syntactic foam comprising rigid microballoons in a resin matrix comprises microballoons (microspheres) embedded in the uncured cured or partially cured matrix resin. The matrix resin may be any of the resins described above with respect to the prepregs. The most common of the microballoons are made of glass, but quartz, phenolic, carbon, thermoplastic and metal coated microballoons are useable.

The microballoons are synthetic hollow microspheres that comprise individual round spheres or bubbles having diameters which range from about 1 to about 500 microns, preferably about 1 to about 200 microns, with wall thickness of about 0.1 to about 20 microns. They typically possess densities ranging from about 0.1 to about 0.5 g./cc. The syntactic foam comprising the rigid microballoons in a resin matrix as a result have relatively low densities such as densities ranging from about 0.5 to about 0.7 g./cm.$^3$. Glass is the most common microballoon material in the practice of the invention, but quartz, phenolic, carbon, thermoplastic and metal coated microballoons are suitably employable. The syntactic foam comprising rigid microballoons in a resin matrix is often provided with a scrim support layer for the purpose of assisting is the handling and support of the syntactic foam layer. In describing this invention, such scrims are treated as integral components of the syntactic foam. Thus the term syntactic foam includes such handling assisting layers such as scrims.

The syntactic foam films have a thickness ranging from about 0.007 to about 0.125 inch and each film is uniform in thickness. Combinations of the syntactic foam films of different thicknesses can be combined to provide thicker sheet forms.

In the typical case, the composite constructions of the invention comprise only the syntactic foam and the prepreg component. However, there are constructions where other materials may be added without departing from the invention. The invention also contemplates the inclusion of one or more layers of a nonwoven fabric provided with a resin binder that is cocurable with the resin of the prepreg and the syntactic foam. These added layers serve to enhance the impact and buckling resistance of the composite structure. The nonwoven layer is provided in the composite construction in contact with the prepreg and/or syntactic foam layers. In the preferred aspect of this embodiment, such additional layers are placed between syntactic foam layers and/or between prepreg layers.

The nonwoven structures may be formed from unspun or spun stable fibers having a length of from about ¼ inch to about 3 inches by garnetting and crosslaying, airlaying on a rotating screen or on an endless tenter arrangement according to the procedure of U.S. Pat. No. 3,538,564, utilizing the apparatus of U.S. Pat. Nos. 3,345,231 and 3,345,232. The nonwoven structures may be resin impregnated by spraying the thermosetting resin as a solvent solution into the batting or scrim-like structures. Preferably, the nonwoven is first bonded with a low cost thermoplastic from a latex or water dispersion or with starch from an aqueous solution, dried to fix the fibers in the nonwoven structure, and then the nonwoven structure is impregnated with the thermosetting resin. The nonwoven can be supported by a scrim layer in much the same manner that the syntactic foam is supported by one or more scrim layers.

In extremely large molded composites, in the range of about one (1) inch and greater, where the syntactic foam comprising rigid microballoons in a resin matrix constitutes less than 25% of the composite's volume, the presence of the syntactic foam tends not to exhibit a contribution, by standard measurements, to the impact resistance of the composite unless the syntactic foam is provided close to the impactable surface of the composite construction.

The composite of the prepreg and the syntactic foam comprising rigid microballoons in a resin matrix may be formed in many ways, as illustrated by the following:

An impact layer of one or more films of the syntactic foam comprising rigid microballoons in a resin matrix is first laid up upon a form to form a syntactic foam layer and one or more layers of the prepreg is placed upon the syntactic foam layer(s) to form a prepreg layer. The uncured composite is then put into an oven and the composite is brought to the cure temperature of the resins in both types of layers.

A layer of the prepreg is unwound from a roll and a layer of the syntactic foam film comprising rigid microballoons in a resin matrix is unwound from a roll, and the two layers are superimposed with the prepreg on the top and the syntactic foam on the bototm. The superimposed layers are then wrapped about a mandrel form to form a spiral wrap about the form with the prepreg layer occupying the outer layer. The uncured composite is then put into an oven and the composite is brought to the cure temperature of the resins in both layers.

A core of the prepreg is first laid up upon a mandrel form and then a cylindrical layer of the syntactic foam film comprising rigid microballoons in a resin matrix is wrapped around the first prepreg layer on the mandrel form. Then one or more layers of the prepreg is wrapped about the cylindrical syntactic foam layer. The uncured composite is then put into an oven and the composite is brought to the cure temperature of the resins in both layers.

Prepreg materials, when cured, are relatively strong and relatively heavy, having a tensile moduli ranging from $6 \times 10^6$ psi for Eglass/epoxy to over $30 \times 10^6$ psi for graphite/epoxy, with a density ranging from 1.46 to 1.8. Syntactic foam comprising rigid microballoons in a resin matrix, when cured, are much less stiff and dense, with a modulus of about 400,000 psi and a density in the range cited above.

I claim:

1. An impact resistant synthetic foam-prepreg composite material comprising at least one layer of a thin film of uniform thickness of a syntactic foam containing rigid microballoons in a resin matrix laminated to a prepreg construction of continuous filaments of high modulus fiber in a thermosetting resin matrix in which the syntactic foam is one or more thin uniform layers located within the composite material sufficiently close to an impact prone surface of the composite to enhance the composite's ability to withstand the impact through such surface and wherein the matrix resin of the syntactic foam is compatible and cocurable with the resin matrix of the prepreg.

2. The impact resistant syntactic foam-prepreg composite material of claim 1 in which at least one layer of the thin film of syntactic foam containing rigid microballoons in a resin matrix is separated from the exterior surface of the composite by about one (1) to about ten (10) layers of such prepreg and at least one layer of the syntactic foam is located within the composite material sufficiently close to an impact prone surface of the composite to enhance the composite's ability to withstand impact through such surface.

3. The composite material of claim 1 wherein the prepreg is a carbon fiber prepreg.

4. The composite material of claim 2 wherein at least one layer of the syntactic foam containing rigid microballoons in a resin matrix laminated to the prepreg construction of continuous filaments of high modulus fiber in a resin matrix is separated from the exterior surface by about one (1) to about five (5) layers of such prepreg.

5. The composite material of claim 4 wherein at least one layer of a thin film of the syntactic foam containing rigid microballoons in a resin matrix laminated to the prepreg construction of continuous filaments of high modulus fiber in a resin matrix is separated from the exterior surface by about one (1) to about three (3) layers of such prepreg.

* * * * *